US006459878B1

(12) United States Patent
Tomoyuki et al.

(10) Patent No.: US 6,459,878 B1
(45) Date of Patent: Oct. 1, 2002

(54) HEATING ASSEMBLY, IMAGE-FORMING APPARATUS, AND PROCESS FOR PRODUCING SILICONE RUBBER SPONGE AND ROLLER

(75) Inventors: Yoji Tomoyuki, Ichikawa (JP); Yusuke Nakazono, Toride (JP); Ken Nakagawa, Moriya-machi (JP); Satoru Taniguchi, Abiko (JP); Hikaru Osada, Toride (JP); Kazuo Kishino, Kawasaki (JP); Masaaki Takahashi, Asaka (JP); Hideo Kawamoto, Tokyo (JP); Osamu Soutome, Kawasaki (JP); Yuji Kitano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/669,665

(22) Filed: Sep. 26, 2000

(30) Foreign Application Priority Data

Sep. 30, 1999 (JP) .......................................... 11-279045
Aug. 31, 2000 (JP) ...................................... 2000-263152

(51) Int. Cl.[7] ............................ G03G 15/20; C08J 9/32
(52) U.S. Cl. .................... 399/331; 399/333; 29/895.32; 492/56; 523/218
(58) Field of Search ................................ 399/331, 333; 29/895.32; 492/56; 521/56, 57, 58, 59; 523/218, 219; 428/36.6, 36.8, 407

(56) References Cited

U.S. PATENT DOCUMENTS

| | | | | |
|---|---|---|---|---|
| 5,148,226 A | 9/1992 | Setoriyama et al. | ........ | 355/290 |
| 5,149,941 A | 9/1992 | Hirabayashi et al. | ....... | 219/216 |
| 5,210,579 A | 5/1993 | Setoriyama et al. | ........ | 355/285 |
| 5,262,834 A | 11/1993 | Kusaka et al. | .............. | 355/285 |
| 5,319,427 A | 6/1994 | Sakurai et al. | .............. | 355/285 |
| 5,498,644 A | 3/1996 | Reo | .......................... | 523/218 |
| 5,525,775 A | 6/1996 | Setoriyama et al. | ........ | 219/216 |
| 5,717,988 A | 2/1998 | Jinzai et al. | ................ | 399/333 |
| 5,753,156 A | * 5/1998 | Shigemori et al. | ............ | 264/53 |
| 5,840,220 A | 11/1998 | Akamatsu et al. | ............ | 264/15 |
| 6,008,271 A | * 12/1999 | Hosoda et al. | .............. | 523/218 |
| 6,261,214 B1 | * 7/2001 | Meguriya et al. | ............. | 492/56 |

FOREIGN PATENT DOCUMENTS

| | | |
|---|---|---|
| EP | 0 751 174 | 1/1997 |
| JP | 61-243836 | 10/1986 |
| JP | 63-313182 | 12/1988 |
| JP | 1-147577 | 6/1989 |
| JP | 2-157878 | 6/1990 |
| JP | 3-100059 | * 4/1991 |
| JP | 3-100063 | * 4/1991 |
| JP | 4-44075 | 2/1992 |
| JP | 4-44076 | 2/1992 |
| JP | 4-44077 | 2/1992 |
| JP | 4-44078 | 2/1992 |
| JP | 4-44079 | 2/1992 |
| JP | 4-44080 | 2/1992 |
| JP | 4-44081 | 2/1992 |
| JP | 4-44082 | 2/1992 |
| JP | 4-44083 | 2/1992 |
| JP | 4-204980 | 7/1992 |
| JP | 4-204981 | 7/1992 |
| JP | 4-204982 | 7/1992 |
| JP | 4-204983 | 7/1992 |
| JP | 4-204984 | 7/1992 |
| JP | 5-209080 | 8/1993 |
| JP | 6-35356 | * 2/1994 |
| JP | 6-240040 | 8/1994 |
| JP | 8-12888 | 1/1996 |
| JP | 9-114281 | 5/1997 |
| JP | 10-60151 | 3/1998 |
| JP | 10-060151 | 3/1998 |
| JP | 2822142 B2 | 9/1998 |
| JP | 2000-230541 | 8/2000 |

* cited by examiner

*Primary Examiner*—Joan Pendegrass
(74) *Attorney, Agent, or Firm*—Fitzpatrick, Cella, Harper & Scinto

(57) ABSTRACT

A heating assembly having a press roller which has an elastic layer incorporated dispersedly with voids formed by resin microballoons.

The press roller has a low thermal conductivity, hence heat from a heating means can effectively be utilized. It has also a low hardness, so that a pressure contact nip formed between it and the heating means can be made wider.

25 Claims, 4 Drawing Sheets

HEATING ASSEMBLY, IMAGE-FORMING APPARATUS, AND PROCESS FOR PRODUCING SILICONE RUBBER SPONGE AND ROLLER

BACKGROUND OF THE INVENTION

1. Field of the Invention

This invention relates to a heating assembly and an image-forming apparatus, a process for producing a silicone rubber sponge, and a process for producing a silicone rubber sponge roller usable as a press roller for an image-heating assembly of electrophotographic image-forming apparatus such as copying machines and laser beam printers.

2. Related Background Art

Heating assemblies are conventionally in wide use as, e.g., heat-fixing assemblies for fixing unfixed images onto recording mediums used in image-forming apparatus, image-heating assemblies for heating recording mediums to modify their surface properties such as gloss, and heat-treating assemblies for drying or laminating target materials by heating.

A prior-art heating assembly will be described below taking the case of a heat-fixing assembly equipped in image-forming apparatus such as electrophotographic copying machines and printers.

The heat-fixing assembly of image-forming apparatus is a unit by which an unfixed image (toner image) corresponding to intended image information, formed and carried on a recording medium (such as transfer sheet, electrostatic recording paper, electrofax paper and printing paper) by a transfer system or direct system is thermally fixed as a permanent fixed image onto the surface of the recording medium. Widely used as the heat-fixing assembly is an assembly of contact heating type in which a heating means and a pressing means are face to face brought into pressure contact to form a pressure contact nip (a fixing nip), and a recording medium to which images are to be fixed is guided into the pressure contact nip and is held and transported between them to cause the unfixed image to fix to the recording medium surface by heat and pressure, as in a heating roller system and a film heating system. These heating systems are described below.

A) Heating Roller System

This is basically constituted of a pair of rollers pressure-contacted in parallel, consisting of a heating roller (fixing roller) as the heating means and an elastic press roller as the pressing means. The pair of rollers are rotated and the recording medium to which images are to be fixed is guided into a pressure contact nip between the pair of rollers and is held and transported between them to cause the unfixed image to fix to the recording medium surface by heat and pressure, i.e., by the heat of the heating roller and the pressure at the pressure contact nip.

B) Film Heating System

The film heating system is disclosed in, e.g., Japanese Patent Applications Laid-Open No. 63-313182, No. 2-157878, No. 4-44075, No. 4-44083, No. 4-204980 and No. 4-204984. The film heating system has a heating element and a heat-resistant film (fixing film) as the fixing means and has an elastic press roller as the pressing means. The heat-resistant film is brought into pressure contact with the heating element by the aid of the elastic press roller to form a pressure contact nip, and the heat-resistant film is brought into close contact with the heating element and is transported being slidably rubbed, where a recording medium to which images are to be fixed is guided between the heat-resistant film and the elastic press roller at the pressure contact nip to allow this recording medium to be transported together with the heat-resistant film. At this stage, the unfixed image is fixed to the recording medium surface by heat and pressure, i.e., by the heat applied from the heating element to the recording medium through the heat-resistant film and by the pressure applied at the pressure contact nip. The recording medium is separated from the heat-resistant film after it has passed the pressure contact nip.

In the heating assembly of this film heating system, a linear heating element with a low heat capacity can be used and a thin film with a low heat capacity as the heat-resistant film, and hence energy can be more saved and the waiting time can be more shortened (can be started more quickly). Also, the heating assembly of this film heating system has types of a system in which an endless belt is used as the heat-resistant film and, as a means for driving the film rotatingly, a drive roller is provided on the inner peripheral side of the film to drive the film rotatingly while a tension is applied to the film, and a system in which the film is externally loosely fitted to a film guide and a pressing rotating member as a pressing means is driven to move the film to follow up the pressing rotating member. The latter pressing rotating member drive system is often used because of an advantage that component parts can be fewer.

In the heating assembly in which the heating means and the press roller are face to face provided to form the pressure contact nip as a heating target material heating zone and the heating target material is treated by heat and pressure as in the heat-fixing assembly of the heating roller system or film heating system described above, in order to make the assembly high-speed and its waiting time shorter the press roller may be formed of an elastic material and the pressure contact nip formed between the roller and the heating means on account of the former's elastic deformation may be made wider so that the time for providing a sufficient quantity of heat to the heating target material can be ensured to improve efficiency for imparting heat to the heating target material. However, only making the pressure contact nip merely wider makes the heating assembly itself larger and at the same time results in an increase in power consumption. Accordingly, the assembly must further be improved in thermal efficiency in order to make the assembly small-sized and to achieve cost reduction and low power consumption.

From the viewpoint of an improvement in thermal efficiency of the heating assembly, the quantity of heat taken away from the heating means to the pressing means side is not negligible. Accordingly, in order to make the assembly high-speed and achieve its low power consumption, it is desired to make the pressing means have a low heat capacity. As a means for making such a pressing means have a low heat capacity, it is known, as disclosed in, e.g., Japanese Patent Application Laid-Open No. 9-114281, that a pressing rotating member having superior heat insulation properties can be produced in a good mass productivity by incorporating an elastic layer of the pressing means press roller with a hollow filler.

As the hollow filler, inorganic fillers containing air in the interior such as hollow silica, alumina, glass and glass fiber are used. However, when such inorganic type hollow fillers are used, the fillers are so hard as to make the press roller's elastic layer hard, bringing about a problem that a great pressure must be applied in order to ensure a wide fixing nip.

In addition, in heating assemblies of electrophotographic image-forming apparatus, the assemblies have become more small-sized in recent years, and press rollers used therein have also become more small-sized. Making press rollers have a small diameter brings about a tendency of making the elastic layer have a low hardness in order to ensure the nip width at the time of fixing; the elastic layer being covered on the periphery of a press roller mandrel. For example, as disclosed in Japanese Patent Publication No. 4-77315, those making use of a foamed elastic material (sponge rubber) in the elastic layer are put into practical use in a large number. However, at the time a blowing agent mixed in silicone rubber is heated to cause blowing, its blowing pressure may break cell walls of silicone rubber to make some cells of the resultant foam uncovered to the surface, or make very thin the cell walls that isolate the foam cells from the atmosphere, to form virtual concavities. Also, in the case when silicone rubber is blown in a mold, the blowing pressure extends in irregular directions, and hence irregular blowing stress stands occurred in the rubber. Thus, once the silicone rubber is taken out of the mold after blowing, such irregular stress is set free to cause irregularity or unevenness at the rubber surface.

If a silicone rubber roller comprised of such a foam is used as the press roller, the fused toner having offset-adhered to the heating roller or heating film is transferred to cause contamination of the press roller.

Where a sponge elastic member as a foamed elastic member comprising a mandrel and a foamed silicone rubber provided thereon is formed and a heat-resistant release layer of a fluorine resin such as PFA or PTFE is formed on its periphery by coating, its coating agent may enter the uncovered cells or concavities of the foam to make it difficult to form a release layer having a smooth surface and a uniform thickness. Also, where the release layer is formed by covering the sponge elastic member with a fluorine resin tube, there has been a problem that the fluorine resin tube may become uneven after the shape of uncovered cells of the foam when it stands under pressure and hence, when paper is fed, the press roller is contaminated because of an offset slight enough to be invisible and a toner present on the back of the paper.

The press roller used in heat-fixing assemblies is required to have properties that its hardness and thermal conductivity do not change because of any heat history repeated over a long period of time. This is because the nip width changes with a change in hardness and also the fixing efficiency decreases with an increase in thermal conductivity.

As one of methods of producing the sponge rubber, a method is also known in which resin microballoons are utilized. As an example thereof, as disclosed in Japanese Patent Applications Laid-Open No. 8-12888 and No. 5-209080, unexpanded microballoons are mixed in rubber, followed by heating to cause the resin microballoons to expand and harden simultaneously.

As another method, for the purpose of solving a problem (non-uniformity of cells) in the above method, proposed as a method of producing the sponge rubber is a method in which resin microballoons having previously been expanded are mixed in a liquid compound and a cross-linked rubber molded product is obtained at a temperature not higher than the resin melting temperature and also proposed is a transfer drum produced by such a method (Japanese Patent Application Laid-Open No. 10-060151).

Expanded resin microballoons are used as fillers in various coating materials and plastic materials.

Since, however, they tend to fly in all directions (scatter), a method is proposed to prevent scattering. For example, Japanese Patent No. 02822142 discloses a method in which unexpanded microballoons and a wetting agent (plasticizer) are mixed at a temperature not higher than the expansion start temperature of the unexpanded resin microballoons and thereafter the mixture obtained is heated to a temperature near to the expansion start temperature of the unexpanded resin microballoons to obtain expanded resin microballoons. Japanese Patent Application Laid-Open No. 6-240040 also discloses a method of producing microballoons that may less scatter and have superior handling properties; the microballoons being characterized in that fine inorganic material particles are fastened through a binder resin to the surfaces of microballoons formed by heat-expanding thermoplastic resin microcapsules containing a low-boiling organic solvent.

However, in the method of producing a silicone rubber sponge compounded with the resin microballoons having previously been expanded, the expanded resin microballoons have a very low specific gravity, and have a problem that they must be stored in a very bulky form and besides can be mixed in silicone rubber materials with great difficulty. In the prior art method in which unexpanded microballoons and a wetting agent (plasticizer) are mixed at a temperature not higher than the expansion start temperature of the unexpanded resin microballoons and thereafter the mixture obtained is heated to a temperature near to the expansion start temperature of the unexpanded resin microballoons to obtain expanded resin microballoons, the wetting agent (plasticizer) is exemplified by phthalate type plasticizers, aliphatic dibasic acid ester type plasticizers and epoxy type plasticizers. These, however, have a poor compatibility with liquid silicone, and may cause a problem on storage stability, such as separation, when the expanded resin microballoons are mixed with the liquid silicone.

In the case of the microballoons to the surfaces of which fine inorganic material particles are fastened through a binder resin and which may less scatter and have superior handling properties, too, no sufficient heat insulation properties can be achieved in some cases.

Under such circumstances, it is sought to provide a method which makes use of neither the wetting agent nor the fine inorganic material particles when expanded resin microballoons are used as a filler.

SUMMARY OF THE INVENTION

Accordingly, a first object of the present invention is to provide a heating assembly making use of a press roller which has a low thermal conductivity, may hardly take heat away from the heating means, has a low surface hardness, and can make the fixing nip wider, and an image-forming apparatus having such a heating assembly as a heat-fixing assembly.

A second object of the present invention is to provide a heating assembly that may hardly cause contamination of its press roller with toner.

A third object of the present invention is to provide a process for producing a silicone rubber sponge and a silicone rubber sponge roller by using resin microballoons, in which the resin microballoons have been prevented from scattering without affecting the thermal conductivity (heat insulation properties) of the silicone rubber produced.

A fourth object of the present invention is to provide a process for producing a roller that does not change in hardness and thermal conductivity even where it has undergone heat history as a press roller used in the heat-fixing assembly.

First, the present invention is a heating assembly comprising a heating means for heating a sheetlike heating target material and a press roller disposed face to face with the heating means; the heating target material being guided to a pressure contact nip formed between the heating means and the press roller so as to be held and transported between them to heat the heating target material; wherein;

the press roller has an elastic layer incorporated dispersedly with voids formed by resin microballoons.

The voids incorporated dispersedly in the elastic layer of the press roller used in the heating assembly of the present invention are formed by resin microballoons. The resin microballoons are an organic filler, and they are softer than inorganic fillers and do not make the elastic layer excessively hard. Hence, the fixing nip (pressure contact nip) can be formed in a sufficient width upon application of light pressure. Also, since the resin microballoons are an organic filler, they have a lower thermal conductivity than inorganic fillers, and are advantageous in that a thermal conductivity of 0.146 W/m·K or lower which is desirable for the elastic layer can be achieved.

The resin microballoons are also microballoons whose shells are formed of a resin and in the interiors of which a gas is enclosed. Hence, the resin microballoons neither forms any cells uncovered to the elastic layer surface nor forms any concavities at the elastic layer surface. Also, even when the elastic layer containing such resin microballoons dispersedly is formed by mixing unexpanded resin microballoons internally holding a volatile substance, with an elastic material and thereafter heat-expanding the unexpanded resin microballoons, the pressure of expansion that is ascribable to the volatile substance is checked by the shells and hence neither uncovered cells nor concavities are formed at the elastic layer surface. Thus, a press roller that can be free of contamination with toner can be provided.

Second, the present invention is a process for producing a silicone rubber sponge, comprising the steps of heat-expanding unexpanded resin microballoons wet-treated with a silicone oil, mixing the heat-expanded resin microballoons in a liquid silicone rubber material, and heat-curing the liquid silicone rubber.

In this silicone rubber sponge production process of the present invention, the unexpanded resin microballoons are wetted with a silicone oil and thereafter heat-expanded at an appropriate temperature, so that the surfaces of expanded resin microballoons stand covered with the silicone oil in a very small quantity, and hence the balloons readily adhere to one another and can be prevented from scattering. Also, since the silicone oil is a material equivalent to the silicone rubber, it does not substantially affect the thermal conductivity of the silicone rubber sponge produced.

Third, the present invention is a process for producing a roller, comprising the steps of heat-expanding unexpanded resin microballoons, mixing the heat-expanded resin microballoons in a liquid silicone rubber material, heating the mixture on a mandrel to cure the liquid silicone rubber, and, after heat-curing the liquid silicone rubber material, heating the resin microballoons at a temperature not lower than the expansion start temperature of the resin microballoons to break the shape of microballoons the shell resin of the resin microballoons provides. The process may preferably further comprise, after breaking the shape of the resin microballoons, the step of forming a release layer on the roller surface. The roller thus produced is especially effective as a press roller making use of resin microballoons not having a sufficient high-temperature heat resistance, i.e., as a press roller of a heat-fixing assembly comprising a heating means for heating a recording medium holding thereon an unfixed image, to fix the unfixed image, and a press roller disposed face to face with the heating means and brought into pressure contact with the heating means to form a pressure contact nip between them.

More specifically, where a powder consisting of particles making use of a thermoplastic resin in shells and holding a volatile substance internally is employed as the unexpanded resin microballoons, an elastic layer is formed in which heat-expanded resin microballoons are dispersed in silicone rubber sponge as they are.

In such an elastic layer, the thermoplastic resin is harder than the silicone rubber and hence makes the elastic layer hard. Also, when used as the press roller of the heat-fixing assembly, the roller undergoes heat history, so that the shells formed of the thermoplastic resin may break or undergo thermal decomposition or carbonization to lose the hardness attributable to the presence of the shells, resulting in a decrease in roller hardness or an increase in thermal conductivity to cause variations in fixing performance. Such a break of shells tends to be caused by what is called temperature rise at non-paper-feed areas when the roller is used as a press roller for heat fixing. That is, the resin microballoons undergo thermal damage at non-paper-feed areas to cause a local decrease in roller hardness to bring about a problem on transport performance in some cases. This is because, where small-sized sheets of paper are continuously passed, the non-paper-feed region of the press roller is continuously directly heated by a fixing member, and hence, even when the paper-feed region on the press roller surface is maintained at 150° C. or below, the surface temperature of the non-paper-feed region may reach about 250° C.

Accordingly, in the above roller production process of the present invention, the shells which provide the shape of resin microballoons are broken, whereby such problems can be solved. Also, the shells which provide the shape of resin microballoons may be broken at any stage, i.e., before or after the release layer is formed or at the same time the release layer is formed. In the case when the shells which provide the shape of resin microballoons are broken after the release layer is formed, the gas component generated with the break of resin is enclosed and there is a possibility of deteriorating the silicone rubber depending on the type of the resin to be broken. Hence, the shells which provide the shape of resin microballoons may most preferably be broken before the release layer is formed.

BRIEF DESCRIPTION OF THE DRAWINGS

DETAILED DESCRIPTION OF THE PREFERRED EMBODIMENTS (1) Image-forming Apparatus FIG. 1 is a schematic illustration showing an example of the construction of an image-forming apparatus. The image-forming apparatus of this example is a laser beam printer utilizing a transfer type electrophotographic process.

Figure 1:
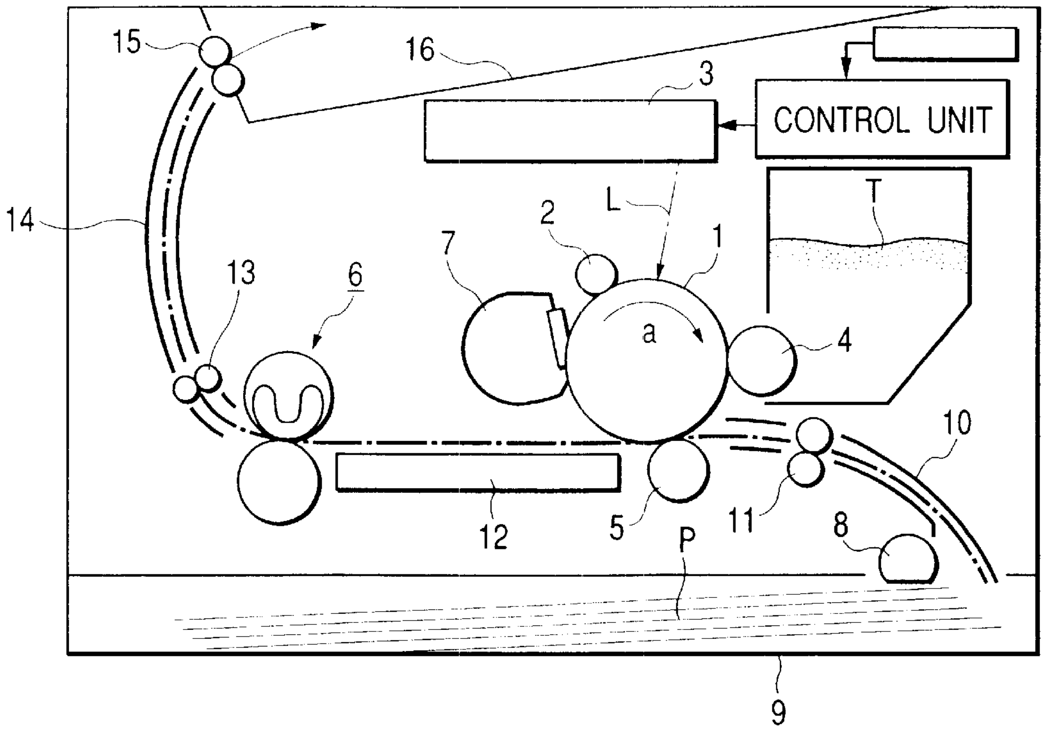
FIG. 1 is a schematic illustration showing an example of the construction of the image-forming apparatus of the present invention.

Reference numeral 1 denotes a rotating drum type electrophotographic photosensitive member (hereinafter "photosensitive drum") serving as an image bearing member, which is rotatingly driven in the clockwise direction shown by an arrow at a predetermined peripheral speed (process speed). The photosensitive drum 1 is constituted of a photosensitive material layer such as an OPC, amorphous Se or amorphous Si layer formed on the periphery of a cylindrical (drum type) conductive substrate made of aluminum or nickel. The photosensitive drum 1 is uniformly charge-processed to predetermined polarity and potential in the course of its rotation by means of a charging roller serving as a charging means. The uniformly charged surface of the photosensitive drum 1 being rotated is subjected to scanning exposure to light L using laser beams modulation-controlled (ON/OFF control) correspondingly to time sequential electrical digital pixel signals of the intended image information, emitted from a laser beam scanner 3, so that an electrostatic latent image of the intended image information is formed on the surface of the rotating photosensitive drum.

The latent image thus formed is developed with a toner T in a developing assembly 4 and rendered visible as a toner image. As developing methods, jumping development, two-component development, FEED development and so forth are used, any of which is often used in combination with image exposure and reverse development.

Meanwhile, a transfer medium P as a recording medium, held in a paper feed cassette 9, is sheet by sheet sent out as a paper feed roller 8 is driven, and is passed through a sheet path having a guide 10 and a resist roller 11. Then, at a predetermined controlled timing, it is fed to a transfer nip zone at which the photosensitive drum 1 comes into pressure contact with a transfer roller 5, and the toner image formed on the surface side of the photosensitive drum 1 is subsequently transferred to the surface of the transfer medium P being thus fed. The transfer medium P having come apart from the transfer nip is subsequently separated from the surface of the rotating photosensitive drum 1, and then guided to a heat-fixing assembly 6 as a heating assembly by means of a transport assembly 12, where the toner image is subjected to heat-fixing treatment. The heat-fixing assembly 6 will be detailed in the next item (2).

The transfer medium having come apart from the heat-fixing assembly 6 is passed through a sheet path having a transfer roller 13, a guide 14 and a paper output roller 15, and then outputted to a paper output tray as a print.

The rotating photosensitive drum 1 from which the transfer medium has been separated is treated by a cleaning assembly 7 to remove deposited contaminants such as transfer residual toner and so forth to have a cleaned surface, and is repeatedly served for image formation.

(2) Heat-fixing Assembly 6

Figure 2:
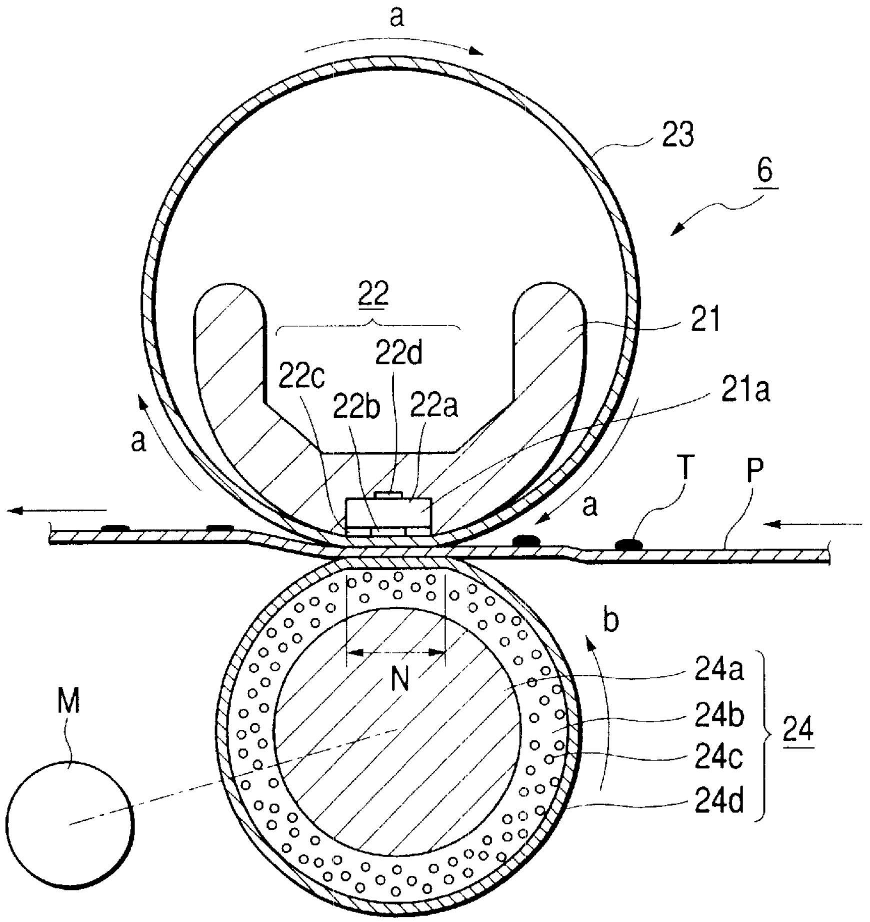
FIG. 2 is a schematic illustration of the construction of a heat-fixing assembly in the apparatus shown in FIG. 1.

FIG. 2 is a schematic diagrammatic illustration of the construction of the heat-fixing assembly 6 used as a heating assembly in the present example. The heat-fixing assembly 6 in the present example is a heating assembly of what is called a tensionless type film heating system/pressing rotating member (press roller) drive system, disclosed in, e.g., Japanese Patent Applications Laid-Open Nos. 4-44075 to 4-44083 and Nos. 4-204980 to 4-204984.

Reference numeral 21 denotes an oblong film guide member (stay) which has the shape of a half arc or a tub in transverse cross section and has a long dimension in the direction vertical to the paper surface of the drawing; 22, an oblong heating element received and held in a groove formed along the long dimension of the film guide member 21 at its substantially middle portion at the under surface; 23, and endless belt type (cylindrical) heat-resistant film fitted externally loosely to this film guide member 21 with a heating element. These components 21 to 23 are members on the side of heating means.

Reference numeral 24 denotes an elastic press roller as a pressing means brought into pressure contact with the under surface of the heating element 22 interposing the film 23 between them. Letter symbol N denotes a pressure contact nip (fixing nip) formed between the press roller 24 and the heating element 22 on account of elastic deformation of an elastic layer 24*b* of the former brought into pressure contact with the heating element 22 interposing the film 23 between them. The press roller 24 is rotatingly driven in the counterclockwise direction shown by an arrow b, at a predetermined peripheral speed upon transmission of a drive powder of a derive power source M through a mechanical-power transmission mechanism such as gears (not shown).

The film guide member 21 is, e.g., a molded product of a heat-resistant resin such as PPS (polyphenylene sulfite) or a liquid crystal polymer.

The heating element 22 is, in the present example, a ceramic heater having a low heat capacity on the whole, comprised of an oblong thin-sheet type heater substrate 22*a* made of alumina or the like, a linear or thin-belt type electrification heating element (resistance heating element) 22*b* made of Ag/Pb or the like, so provided as to be formed along the long dimension on its surface side (the surface side on which the film is slidably moved), a thin surface protective layer 22*c* such as a glass layer, and a temperature detecting device 22*d* such as a thermistor, provided on the back side of the heater substrate 22*a*. This ceramic heater 22 undergoes temperature rise quickly upon supply of an electric power to the electrification heating element 22*b*, and is temperature-controlled to a predetermined fixing temperature by means of a power control system having the temperature detecting device 22*d*. In order to make heat capacity small and improve quick start performance of the assembly, the heat-resistant film 23 preferably has a total film thickness of 100 μm or smaller, more preferably 60 μm or smaller and 20 μm or larger and is, e.g., a single-layer film formed of PTFE (polytetrafluoroethylene), PFA (perfluoroethylene perfluoroalkyl vinyl ether) or PPS, having heat resistance, releasability, strength and durability; or a composite-layer film formed by coating PTFE, PFA or FEP (tetrafluoroethylene perfluoroalkyl vinyl ether) as a release layer on the surface of a base film formed of polyimide, polyamide-imide, PEEK (polyether ether ketone) or PES (polyether sulfone). The press roller 24 is comprised of a mandrel 24*a* made of iron or aluminum, an elastic layer 24*b* incorporated with a hollow filler 24*c*, and a release layer 24*d*. This press roller 24 will be detailed in the next item (3).

The film 23 is rotatingly driven without wrinkles as the press roller 24 is rotatingly driven at least at the time the image formation is performed. As the press roller 24 is rotatingly driven, its rotating force acts on the film 23 on account of the friction between the press roller 24 and the outer surface of the film 23 at the pressure contact nip N, where the film is driven while it is slidingly moved in close contact of its inner surface with the under surface (the surface) of the heating element 22 at the pressure contact nip N, around the outside of the film guide member 21 in the clockwise direction shown by an arrow and at a predetermined peripheral speed, i.e., at substantially the same peripheral speed as the transport speed of the transfer medium P holding thereon an unfixed toner image T, transported from the side of an image transfer zone. In this case, in order to reduce the sliding friction between the inner surface of the film 23 and the under surface of the heating element on which the former is slidingly moved, a lubricant such as a heat-resistant grease may be interposed between the both.

Thus, as the press roller 24 is rotatingly driven, the film 23 is rotated. Also, in the sate the heating element 22 has risen to a predetermined temperature and kept temperature-controlled, the transfer medium P as a heating target material, having the unfixed toner image T, is guided to the pressure contact nip N between the press roller 24 and the film 23 with its toner image holding surface side facing the film 23 side, to come into close contact with the film outer surface at the pressure contact nip N, and is held and transported through the pressure contact nip N together with the film 23. Thus, the heat of the heating element 22 is imparted thereto via the film 23 and, upon receipt of the pressure at the pressure contact nip N, the unfixed toner image T is fixed to the transfer medium P by heat and pressure. The transfer medium P having passed the pressure contact nip N is separated from the outer surface of the film 23 and then transported further.

The assembly 6 of a film heating system as in the present example can employ a heating element 22 having a small heat capacity and causing a quick temperature rise. Hence, the time taken for the heating element 22 to reach a predetermined temperature can greatly be shortened. It can readily reach a high temperature from normal temperature, and hence it is unnecessary to make stand-by temperature control when the assembly is on stand-by at the time of non-printing, thus power saving can be achieved.

In addition, any tension does not substantially act on the film 23 being rotated, except for the pressure contact nip N. Hence, the film guide member 21 of the film 23 standing rotated may produce only a small approaching force along the long dimension of the film guide member 21. Hence, as a film approaching control means, it is enough to provide only a flange member for merely receiving ends of the film 23, bringing about an advantage that the assembly can be made simple.

(3) Press Roller 24

As mentioned above, the press roller 24 serving as a pressing rotating member in the heat-fixing assembly 6 has the mandrel 24*a* and the elastic layer 24*b*. The elastic layer 24*b* is incorporated with resin microballoons as the filler 24*c*.

The press roller 24 has the elastic layer 24*b* and the release layer 24*d*, and the release layer 24*d* is formed at the outermost surface and is comprised of a fluorine resin or fluorine rubber. The elastic layer 24*a* of the press roller 24 may be made to have a thermal conductivity within a certain range, whereby the heat the heating element 22 is taken away from the press roller 24 can be controlled to a small quantity. This enables an improvement of temperature rise of the film 23 surface and enables quick start of the heat-fixing assembly 6. This thermal conductivity may preferably be 0.146 W/m·K or lower. Also, if it is lower than 0.084 W/m·K, the press roller 24 can have a higher rate of temperature rise to provide a good fixing performance, but may case a great temperature rise at the non-paper-feed area when small-sized paper is fed, so that the press roller 24 is required to have a higher heat resistance.

The thermal conductivity of the elastic layer is measured with a surface thermal conductivity meter (trade name: QTM-500; manufactured by Kyoto Denshi K.K.). More specifically, a sensor probe (model: PD-11, manufactured by Kyoto Denshi K.K.) of the surface thermal conductivity meter is brought into contact with the surface of the elastic layer of the press roller to measure the thermal conductivity of the elastic layer.

The press roller 24 may also preferably have a surface roughness Ra (JIS B0601) of 3 $\mu$m or less.

The elastic layer 24*b* used in the press roller 24 may have any thickness without any particular limitations as long as it has a thickness which enables formation of the pressure contact nip N in the desired width. Preferably, it may have a thickness of from 2 to 6 mm. In the present invention, the elastic layer 24*b* may be formed of any material without any particular limitations as long as it is a rubber composition containing resin microballoons 24*c* and has the thermal conductivity of 0.146 W/m·K or lower. The resin microballoons 24*c* are substantially spherical, having an average particle diameter of about 100 $\mu$m. Since they contain air in their interiors, which has good heat insulation properties, the incorporation of such resin microballoons as a filler in the elastic layer 24*b* can make the elastic layer 24*b* have such a low thermal conductivity.

The incorporation of such a filler in the elastic layer 24*b* can also make the elastic layer 24*b* have such a low thermal conductivity even if any foamed material is not used as the elastic layer. This makes it possible to make the elastic layer 24*b* have a low surface roughness, so that the surface of the release layer 24*d* can be made not to become uneven also at the pressure contact nip N of the press roller 24.

Taking account of the above effect to be imparted to the press roller 24 and of moldability required when silicone rubber is incorporated with resin microballoons, the resin microballoons 24*c* may preferably have an average particle diameter of from 80 to 300 $\mu$m, and, in view of the stability of thermal conductivity, more preferably from 80 to 200 $\mu$m. The resin microballoons 24*c* may also preferably have a true density of 400 kg/m$^3$ or lower, and, taking account of operability for silicone rubber, more preferably a true density of from 20 to 60 kg/m$^3$.

As preferred examples of the resin making up the shells of such resin microballoons 24*c*, it may include vinylidene chloride resins and acrylonitrile resins as thermoplastic resins, and phenolic resins as thermosetting resins. Resin microballoons comprised of any of these materials may be used alone, or may be used as a mixture of two or more types.

As elastic layer 24*b* base materials in which the resin microballoons are to be incorporated, any of those known as materials for elastic layers of conventional press rollers may be used, and silicone rubber and fluorine rubber may preferably be used.

The resin microballoons 24*c* in the elastic layer 24*b* may be in any content without any particular limitations as long as the elastic layer 24*b* has thermal conductivity within the above range. For example, thermal conductivities of the elastic layer 24*b* are individually measured where the content of the resin microballoons 24*c* is varied, and the content in which preferable thermal conductivities are attained may be selected as a preferable content of the resin microballoons 24*c*.

The elastic layer 24*b* containing the resin microballoons 24*c* may comprise a rubber layer such as silicone rubber layer incorporated with the resin microballoons. Alternatively, a layer comprising such a rubber layer incorporated with the resin microballoons may be formed on a layer comprised of a foam, and this may be used as the elastic layer 24*b* in the present invention.

The release layer 24*d* may be formed by covering the elastic layer 24*b* with a PFA tube, or may be formed by coating the elastic layer 24*b* with a fluorine resin such as PTFE, PFA or FEP. The release layer 24*b* may have any thickness without any particular limitations as long as a sufficient releasability can be imparted to the press roller 24. Preferably, it may have a thickness of from 20 to 50 μm.

The elastic layer 24*b* of the press roller 24 thus produced has rubber and also voids formed by the resin microballoons 24*c*, and resin shells of the resin microballoons 24*c* are present between the rubber and the voids. When used as a press roller of the heat-fixing assembly, the press roller undergoes heat history and the resin shells are broken, whereupon the press roller changes in hardness, so that the fixing nip width changes to cause a change in fixing performance. Accordingly, it is also effective to use resin microballoons the resin shells of which do not break even where the roller has undergone heat history. Thermosetting-resin microballoons are effective as such resin microballoons. For example, however, microballoons comprised of acrylonitrile resin are heat-resistant to a temperature of about 200° C., and may cause a problem that the press roller 24 decreases in hardness if the roller comes to have a temperature higher than this. Also, where small-sized transfer mediums P are continuously passed through the heat-fixing assembly, the heat at areas where any transfer mediums P do not pass (herein "non-paper-feed region") on the press roller 24 at the pressure contact nip N is not taken away by the transfer medium P. Hence, where tens of sheets of small-sized transfer mediums P are continuously passed, the temperature of this non-paper-feed region rises to about 200° C. Accordingly, in the press roller 24 of the present embodiment, it may become necessary to take measures such that the number of small-sized transfer mediums P passing the pressure contact nip N per unit time (i.e., throughput) is made greatly smaller, assuming the temperature rise of the roller surface.

As a countermeasure thereto, resin microballoons having shells comprised of a thermosetting, phenolic resin is used. Resin microballoons whose shells are formed of phenolic resin are heat-resistant to a temperature of about 300° C. Hence, when the small-sized papers are continuously fed as the transfer mediums P, the temperature to which the non-paper-feed region is heat-resistant can be set at 230° C. to 240° C. Accordingly, the measure assuming the temperature rise at the non-paper-feed region can be taken with ease and the throughput can be set larger. Hence, the heat-fixing speed per unit time can be made higher.

In order to set the hardness and heat-resistance temperature of the press roller 24 within the stated ranges, it is also effective to use thermoplastic resin microballoons and thermosetting resin microballoons in combination. For example, microballoons whose shells are formed of acrylonitrile resin may cause a great decrease in roller hardness at about 200° C. when the elastic layer 24*b* is incorporated therewith in an amount of 1% by weight or larger, but does not affect the roller hardness when incorporated in an amount smaller than that, even when the press roller 24 comes to have a temperature of 200° C. or above. Accordingly, taking account of the temperature rise in the non-paper-feed region when small-sized papers are continuously fed as the transfer mediums P, it is desirable that the microballoons whose shells are formed of acrylonitrile resin are in a content not more than 1% by weight.

The press roller 24 may also preferably have a hardness (measured with Asker-C Hardness Meter under a load of 600 g) of 55° or lower, and more preferably 50° or lower. In order to make the press roller 24 have a hardness within this range, microballoons whose shells are formed of phenol resin may preferably be incorporated in an amount not more than 20% by weight.

Since the press roller 24 decreases in hardness when the resin microballoons 24*c* contained in the elastic layer 24*b* of the press roller 24 are broken where the roller has undergone heat history in the course of its use in the heat-fixing assembly, it is also effective that the resin shells of the resin microballoons 24*c* incorporated in the elastic layer 24*b* are previously broken so that the resin shells are kept present between the rubber and the voids in the state they have been broken. Production of such a press roller will be described below.

The unexpanded resin microballoons used are powder consisting of particles making use of a thermoplastic resin in shells and internally holding a volatile substance, and are expanded by heat. As the thermoplastic resin, a vinylidene chloride/acrylonitrile copolymer, a methyl methacrylate/acrylonitrile copolymer and a methyl methacrylonitrile/acrylonitrile copolymer are exemplified. As the volatile substance held internally, hydrocarbon type blowing agents such as butane and isobutane are known in the art.

As the resin forming the shells, those having softening temperatures within an appropriate range may be selected in accordance with curing temperatures of liquid silicone rubber materials.

These unexpanded resin microballoons are readily commercially available from Matsumoto Yushi-Seiyaku Co., Ltd. as "Matsumoto Microspheres F" series, and from Expancell Co. as "Expancell" series. These commercially available unexpanded resin microballoons usually have diameters of from about 1 to 50 μm, which are expanded at a suitable heating temperature into spheres close to almost true spheres, having diameters of from about 10 to 500 μm.

Silicone oils used to prevent the resin microballoons from scattering may include dimethylpolysiloxane and methylhydrogenpolysiloxane, as well as various modified silicone oils such as amino-modified silicones, epoxy-modified silicones and carbinol-modified silicones. The silicone oil not more than equivalent amount may be added to unexpanded resin microballoons, followed by leaving or stirring. There are no particular limitations on the manner of wetting. The silicone oil may be added in an amount of from 50 to 100 parts by weight based on 100 parts by weight of the unexpanded resin microballoons. If it is less than 50 parts by weight, no sufficient effect of preventing scattering may be obtained. If it is more than 100 parts by weight, the expansion of microballoons may involve a difficulty.

Subsequently, the resin microballoons heat-expanded to the size stated above are cooled and thereafter mixed, kneaded and dispersed in a liquid silicone rubber material. Here, in order to prevent the expanded resin microballoons from breaking by heat, the microballoons may preferably be mixed at a temperature not higher than the softening point of the resin constituting the expanded resin microballoons when mixed or kneaded.

The liquid silicone rubber material may be any of those which stand liquid at normal temperature, and cure by heat into silicone rubber having a rubber elasticity. There are no particular limitations on its types and so forth. Such liquid silicone rubber materials may include addition-reaction-curable liquid silicone rubber compositions which are comprised of a diorganopolysiloxane containing alkenyl groups, an organohydrogenpolysiloxane containing hydrogen atoms bonded to silicon atoms and a reinforcing filler and are capable of curing into silicone rubber by the aid of a platinum-group catalyst; organoperoxide-curable silicone rubber compositions which are comprised of a diorganopolysiloxane containing alkenyl groups and a reinforcing filler and are capable of curing into silicone rubber by the aid of an organoperoxide; and condensation-reaction-curable liquid silicone rubber compositions which are comprised of a diorganopolysiloxane containing hydroxyl groups, an organohydrogenpolysiloxane containing hydrogen atoms bonded to silicon atoms and a reinforcing filler and are capable of curing into silicone rubber by the aid of a condensation reaction accelerator catalyst such as an organotin compound, an organotitanium compound or a platinum-group catalyst. Of these, addition-reaction-curable liquid silicone rubber compositions are preferred as having a high curing rate and a superior curing uniformity.

In order for cured products to be formed as rubber elastic materials, they may preferably be those composed chiefly of straight-chain diorganopolysiloxane and having a viscosity at 25° C. of 100 centipoises or higher.

In order to adjust fluidity or improve mechanical strength of the cured products, this liquid silicone rubber material may also be mixed with a filler of various types and optionally with a pigment, a heat-resisting agent, a flame retardant, a plasticizer, an adhesion-providing agent and so forth as long as what is aimed in the present invention is not damaged.

The expanded resin microballoons may be mixed in an amount selected in accordance with the desired heat insulation properties. They may preferably be mixed in an amount of from 1 to 10 parts by weight based on 100 parts by weight of the liquid silicone rubber material.

If they are less than 1 part by weight, any sufficient heat insulation properties required for the press roller may not be obtained. If they are more than 10 parts by weight, the liquid silicone rubber material may have a high viscosity to make it difficult to mix and stir the material.

Next, the liquid silicone rubber material containing the resin microballoons is applied on a mandrel, followed by heating and curing at a temperature not higher than the heat expansion temperature to form a roller. There are no particular limitations on the means and method by which the material is heated and cured to form the roller. Simple and preferable is a method in which a mandrel made of metal is inserted to a pipe-like mold having a stated inner diameter, the liquid silicone rubber material containing the resin microballoons is injected, and this mold is heated to form the roller. Here, the resin microballoons may undergo thermal deformation if the heating temperature is not lower than the melting point of the resin microballoons, making it impossible to provide any uniform spongy form in some cases.

More preferably, after the silicone rubber roller formed by curing is demolded, the silicone rubber roller may be heated at a temperature not lower than the above heat expansion temperature. Here, the resin microballoons undergo thermal shrinkage to break, so that the voids remain there, thus a uniform spongy form is maintained. Hence, the spongy form of the silicone rubber roller is not affected by thermal deterioration of resin due to heat history when actually used, and the roller can be used in a stable state.

In order to achieve good heat insulation properties and strength, it is preferable for the heat-expanded resin microballoons to have an average particle diameter of from 80 to 200 $\mu$m.

The average particle diameter refers to an average value of (length+breadth)/2 of 10 balloons picked up at random in a visual field by microscopic observation.

As long as the expanded resin microballoons have an average particle diameter within this range, the heat-insulating press roller can be endowed with the necessary heat insulation properties by mixing them in a small quantity, and also such resin microballoons can be mixed and stirred with the silicone rubber with ease.

If the heat-expanded resin microballoons have an average particle diameter smaller than 80 $\mu$m, they may have to be mixed in a large quantity in order to endow the heat-insulating press roller with the necessary heat insulation properties. If on the other hand those having an average particle diameter larger than 200 $\mu$m are used, a problem may occur in respect of the mechanical strength of the elastic layer.

As the silicone oil, methylhydrogenpolysiloxane is preferred in view of heat resistance of the silicone rubber sponge.

An instance where the silicone oil is an amino-modified silicone oil is also preferred in view of heat resistance of the silicone rubber sponge.

Figure 3:
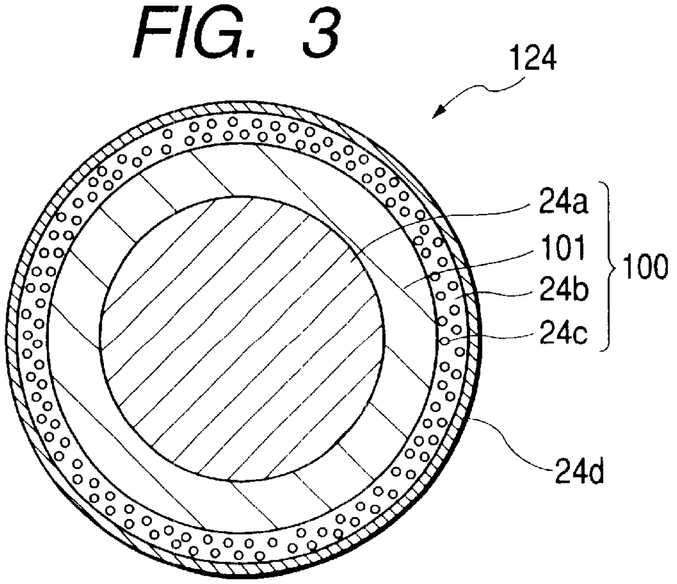
FIG. 3 is an illustration of a press roller incorporated with resin microballoons.

FIG. 3 is a schematic illustration showing the construction of another press roller. This roller is characterized in that an elastic layer 100 of a press roller 124 has a foamed elastic material layer 101 and an elastic layer 24*b* which is formed on the periphery of the foamed elastic material layer 101 and contains microballoons 24*c* having shells. Others are the same as those in FIG. 2.

FIGS. 4A, 4B, 4C and 4D are each a schematic illustration showing another example of the construction of the heating assembly (heat-fixing assembly) of a film-heating system.

Figure 4A:
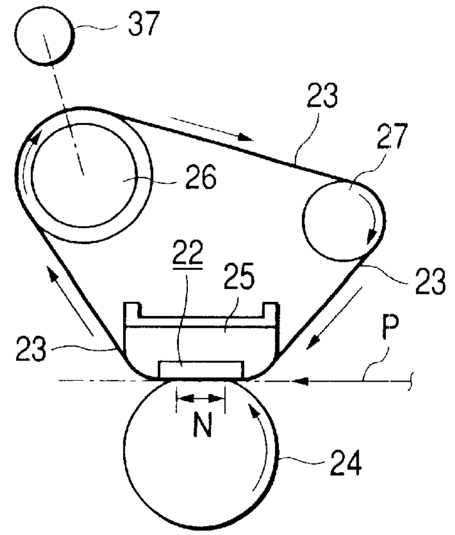
FIGS. 4A, 4B, 4C and 4D are each a schematic illustration showing an example of the construction of a heat-fixing assembly of a film-heating system.

In the assembly shown in FIG. 4A, an endless belt type heat-resistant film 23 is stretched over three members provided substantially in parallel to each other, i.e., over a heating element 22 held with a film guide member 25 serving also as a heating-element holder, a film drive roller 26, and a tension roller 27. The heating element 22 and a press roller 24 are brought into pressure contact interposing the film 23 between them to form a pressure contact nip N, and the film 23 is rotatingly driven by means of a drive roller 23. Reference numeral 27 denotes a drive power source of the film drive roller 26. A transfer medium P as a heating target material is guided into the pressure contact nip N, where a toner image is heat-fixed.

Figure 4B:
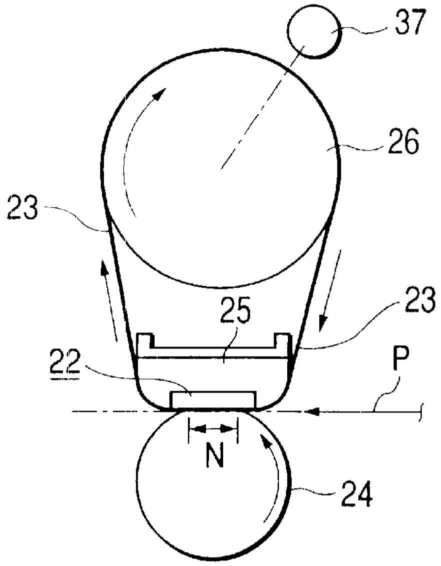

In the assembly shown in FIG. 4B, an endless belt type heat-resistant film 23 is stretched over two members provided substantially in parallel to each other, i.e., over a heating element 22 held with a film guide member 25 serving also as a heating-element holder, and a film drive roller 26. The heating element 22 and a press roller 24 are brought into pressure contact interposing the film 23 between them to form a pressure contact nip N, and the film 23 is rotatingly driven by means of a drive roller 23. The press roller 24 is follow-up rotated with the rotation of the film 23.

Figure 4C:
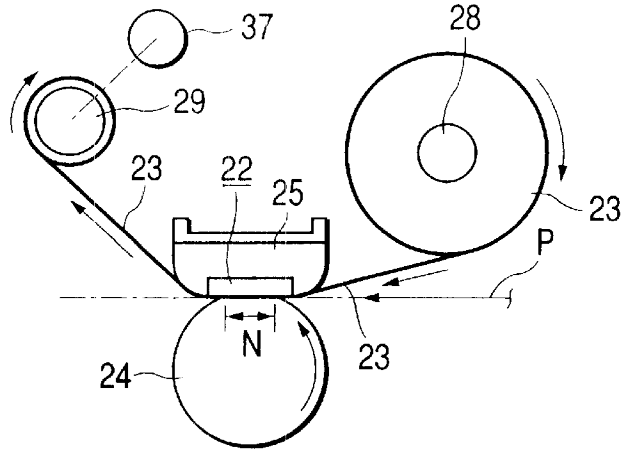

In the assembly shown in FIG. 4C, an endways continuous film wound in a roll is used as a heat-resistant film 23, and this is stretched from a feed shaft 28 over a wind-up roll 29 via the under surface of a heating element 22 held with a film guide member 25 serving also as a heating-element holder. The heating element 22 and a press roller 24 are brought into pressure contact interposing the film 23 between them to form a pressure contact nip N, and the film 23 is wound up with the wind-up roll 29 so as to be traveled and moved at a predetermined speed.

In the assemblies having such forms of construction, the press roller 24 as a pressing means is constructed according to the present invention, and the same operation and effect as described previously are obtainable.

Figure 4D:
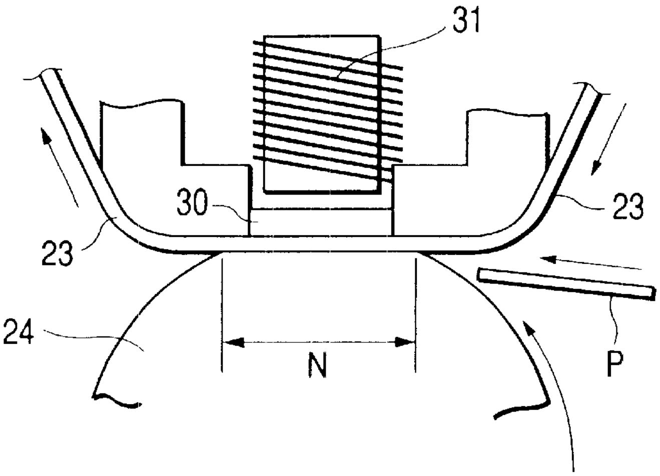

The heating element 22 on the heating means side is by no means limited to the ceramic heater described previously, and any other appropriate heating element of, e.g., electromagnetic (magnetic) induction heating system may be employed. FIG. 4D shows an example of the electromagnetic induction heating system. Reference numeral 30 denotes a magnetic metal member capable of generating heat by electromagnetic induction; and 31, an exciting coil as a magnetic-field generation means. The magnetic metal member 30 generates heat as a heater by electromagnetic induction by virtue of a high-frequency magnetic field generated by electrifying the exciting coil 31, and the heat thus generated is imparted through a film 23 at a pressure contact nip N, to a transfer medium P guided into the pressure contact nip N as a heating target material. The film 23 itself may be formed as a member capable of generating heat by electromagnetic induction.

Figure 5A:
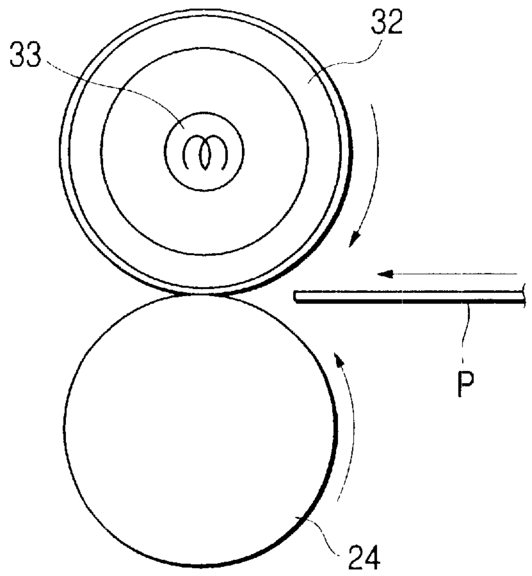
FIGS. 5A and 5B are each a schematic illustration showing an example of the construction of a heat-fixing assembly of a heat roller system.
Figure 5B:
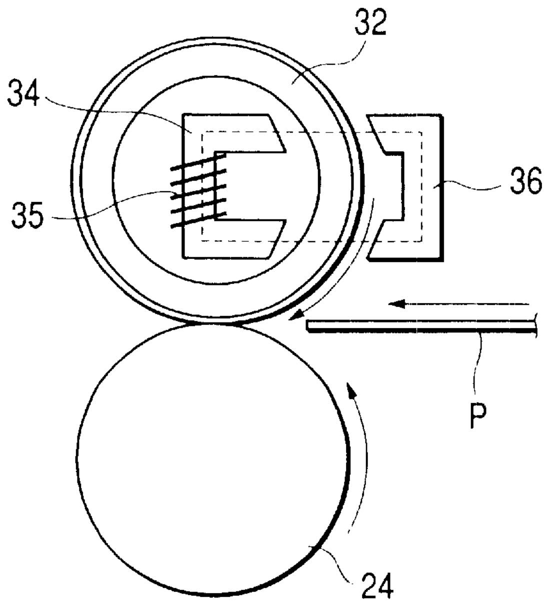

FIGS. 5A and 5B each show an example of the construction of a heating assembly (heat-fixing assembly) of a heat roller system.

In FIG. 5A, reference numeral 32 denotes a heating means heating roller (fixing roller), which is a hollow metal roller made of iron or aluminum on the periphery of which a release layer comprised of fluorine resin or the like has been formed. In its interior, a heat-generating means halogen heater 33 is kept provided. These heating roller 32 and press roller 24 are brought into pressure contact to form a pressure contact nip. A heating target material transfer medium P is guided into the pressure contact nip, where a toner image is heat-fixed.

In the assembly shown in FIG. 5B, a heating roller 32 is heated by an electromagnetic induction heating system. The heating roller 32 is constituted of a ferromagnetic material. To heat the roller, a high-frequency alternating current is applied to an exciting coil 35 wound around an exciting iron core 34 to generate a magnetic field to cause an eddy current in the heating roller 32. More specifically, the eddy current is caused in the heating roller 32 by magnetic flux, and the heating roller 32 itself is caused to generate heat by the Joule effect. Reference numeral 36 denotes an auxiliary iron core so disposed as to face the exciting iron core 34 provided on the other side of the heating roller 32 wall, in order to form a closed magnetic path.

In the heating assemblies of a heat roller system as described above, the press roller 24 as a pressing means is constructed according to the present invention, and the same operation and effect as described previously are obtainable.

The present invention is, in short, effective for heating assemblies in which a heating target material is guided into a pressure contact nip formed between a heating means and a pressing means so as to be held and transported between them to make heat treatment. The heating assemblies are not only usable as the heat-fixing assemblies of the embodiment described above, but also of course widely usable as other heating assemblies, e.g., assemblies for heating recording mediums holding images thereon, to modify their surface properties (such as gloss), assemblies for provisional fixing, and assemblies for drying or laminating sheetlike materials while feeding them.

EXAMPLES

The present invention will be described below in greater detail by giving Examples.

Example 1

Using an aluminum material of 13 mm diameter as the mandrel 24*a*, the elastic layer 24*b* was formed on the periphery of this mandrel 24*a* in the following way.

As the resin microballoons 24*c*, 3 parts (by weight; the same applied hereinafter) of expanded resin microballoons (trade name: F80-ZD; available from Matsumoto Yushi-Seiyaku Co., Ltd.) having an average particle diameter of about 100 $\mu$m, having shells formed of acrylonitrile resin and having a true density of about 35 kg/cm$^3$ were mixed in 97 parts of an addition type liquid silicone rubber (viscosity: 130 Pa·s; specific gravity: 1.17; trade name: DY35-561A/B; available from Dow Corning Toray Silicone Co., Ltd.), followed by heat-cure molding at 130° C. in a mold.

As the result, a 3 mm thick silicone rubber elastic layer 24*b* dispersively including 3% by weight of the resin microballoons was formed. Also, the elastic layer 24*b* had a thermal conductivity of 0.0963 W/m·K, and a surface roughness Ra of 1 $\mu$m.

Next, on the periphery of the elastic layer 24*b*, a 30 $\mu$m thick release layer 24*d* was formed in the following way.

On the elastic layer 24*b*, a fluorine rubber latex (trade name: GLS213; available from Daikin Industries Co., Ltd.) was applied, and the coating formed was externally irradiated with near infrared rays to effect baking at surface temperature of 290° C. for 15 minutes. In this baking step, since the irradiation with near infrared rays was made externally (from the outside), the elastic layer itself was not so much heated, and the resin shells of the resin microballoons were still not broken.

The roller surface standing after the release layer 24*d* was formed on the outermost layer was in a roughness Ra of 1.5 $\mu$m. This elastic roller was used as the press roller 24 of the heat-fixing assembly 6 of a film-heating system shown in FIG. 2, described previously. Its roller hardness was about 45° (measured with Asker-C Hardness Meter under a load of 600 g).

As the film 23, used was a 50 $\mu$m thick seamless tube made of polyimide and on which a 10 $\mu$m thick PTFE layer was formed.

To the whole nip, a pressure of 10 kg as total pressure was kept applied. Here, the nip width was about 6 mm.

To the heating element 22, an electric power of 450 W is supplied, the process speed was set at 72 mm/sec. and the heating element 22 was started up from room temperature, where evaluation was made on the time taken until the heater temperature-controlled temperature rose to 190° C. (rise time), the fixing performance at the time the transfer medium P was fed after 5 seconds, and any contamination of the press roller with toner at the time 100 sheets were continuously passed to print halftone images.

To evaluate the fixing performance, a 5 mm square solid black image was formed as an unfixed image on Fox River 241b paper by printing with LASER SHOT LBP-350 (trade name), a laser beam printer manufactured by CANON INC., and then passed through the heat-fixing assembly under the above conditions. Thereafter, the solid black image thus fixed was rubbed with a nonwoven fabric under a load of 10 g/cm$^2$, and its density before and after rubbing was measured with a reflection type, Macbeth reflection densitometer (RD914, trade name; manufactured by Division of Kollmorgen Instrument Co.) to make evaluation.

The results of evaluation are shown in Table 1. In Table 1, in the items of fixing performance and roller contamination, letter symbols indicate the following evaluation results.

Fixing Performance

A: Good.

C: Poor.

Roller Contamination

A: Not contaminated.

C: Contaminated.

Comparative Example 1

Start-up time of a heat-fixing assembly, image-fixing performance to transfer mediums P and contamination of a roller 24 with toner were evaluated in the same manner as in Example 1 except that a layer formed of only a solid silicone rubber (trade name: DY35-561A/B) was used as the elastic layer and a 30 μm thick layer of a fluorine rubber latex (trade name: GLS213) was used as the release layer. The results of evaluation are shown in Table 1.

Comparative Example 2

Start-up time of a heat-fixing assembly, image-fixing performance to transfer mediums P and contamination of a roller 24 with toner were evaluated in the same manner as in Example 1 except that a layer comprised of a foamed elastic material formed by foaming a liquid silicone rubber (trade name: DY35-560A/B; available from Dow Corning Toray Silicone Co., Ltd.) was used as the elastic layer and a 30 μm thick layer formed of PFA tube (trade name: 450HPJ; available from Du Pont) was used as the release layer. The results of evaluation are shown in Table 1.

Comparative Example 3

Start-up time of a heat-fixing assembly, image-fixing performance to transfer mediums P and contamination of a roller 24 with toner were evaluated in the same manner as in Example 1 except that a layer comprised of 97 parts of a solid silicone rubber (trade name: DY35-560A/B) incorporated with 30 parts of a hollow silica (trade name: CELL-STAR SX39; available from Tokai Kogyo Co., Ltd.) was used as the elastic layer and a 30 μm thick layer of a fluorine rubber latex (trade name: GLS213) was used as the release layer. The results of evaluation are shown in Table 1.

In comparison with Comparative Example 2, the fixing performance is well achievable alike, but the roller contamination is much better preventable in Example 1.

This is because in Comparative Example 2 the PFA tube inevitably follows the foam cell diameter at the time of pressing, and hence unevenness is made at the nip and the toner comes in concavities of such unevenness to accumulate contamination, whereas the press roller in Example 1 has a surface roughness close to the state of mirror surface, and hence no unevenness is made in the roller surface layer at the nip even at the timer of pressing and the roller is by no means contaminated with the toner during paper feed.

In Comparative Example 3, the thermal conductivity can be set low, but for that end the silicone rubber must be incorporated with the hollow silica in a quantity as large as 50 parts, so that the roller has a hardness of 60° or higher even when the material hardness of the rubber is set low. Hence, any wide fixing nip can not be ensured, so that, though a quick start-up is achievable, the quantity of heat necessary for fixing can not be supplied to the transfer medium P and no good results are obtainable on both the fixing performance and the roller contamination.

Example 2

A press roller was produced in the same manner as in Example 1 except that the elastic layer **24*b*** was formed in the following way.

As the resin microballoons **24*c*,** 20 parts of expanded resin microballoons (trade name: BJO-0930; available from Asia Pacific Microsphere Co., Ltd.) having an average particle diameter of about 90 μm, having shells formed of phenol resin and having a true density of about 230 kg/cm$^3$ were mixed in 100 parts of an addition type liquid silicone rubber (trade name: DY35-561A/B), followed by heat-cure molding at 130° C. in a mold.

As the result, a 3 mm thick silicone rubber elastic layer **24*b* dispersively including 16.6% by weight of the resin microballoons was formed. Also, the elastic layer 24*b*** had a thermal conductivity of 0.125 W/m·K, and a surface roughness Ra of 1 μm.

TABLE 1

| Roller: | Comparative Example 1 | Comparative Example 2 | Comparative Example 3 | Example 1 |
|---|---|---|---|---|
| Elastic layer: | Solid silicone | Foamed elastic material | Silicone rubber incorporated with hollow silica | Silicone rubber incorporated with microballoons |
| Surface layer: | Fluorine rubber latex, 30 μm | PFA tube, 30 μm | Fluorine rubber latex, 30 μm | Fluorine rubber latex, 30 μm |
| Rise time to 190° C.: | 11 seconds | 5 seconds | 6 seconds | 5 seconds |
| Fixing performance: | C | A | C | A |
| Roller contamination: | A | C | C | A |

As can be seen from the above results, since the elastic layer **24*b* is incorporated with the resin microballoons 24*c*, the fixing heater 22** starts up earlier than Comparative Example 1, and good fixing performance is obtained even when the transfer medium comes to the fixing nip in a short time.

This is presumed to be due to the resin microballoons **24*c*,** which hold air internally, the air having good heat insulation properties, and hence provides a low thermal conductivity to reduce the quantity of heat taken away to the press roller at the time of start-up of the heater, thus the time taken for bringing about a fixable state at a given electric power can be shortened.

On the press roller thus produced, evaluation was made in the same manner as in Example 1, where good results were obtained on both the fixing performance and the roller contamination. The time taken until the heater temperature-controlled temperature rose to 190° C. was 5 seconds.

In the case of the press roller in Example 1, the temperature of the non-paper-feed region of the press roller rose to 200° C. after small-sized paper envelopes (COM10) were continuously fed by 15 sheets in a fixing evaluation test. Since the resin microballoons in the elastic layer of this press roller were heat-resistant to a temperature of about 200° C., it was necessary to make paper feed intervals longer after 16th sheet feeding by lowering the throughput to a half speed. In contrast, in the case where the press roller of the present Example was used, the temperature of the non-paper-feed region rose only to 220° C. even after paper feed of 50 sheets. Also, the resin microballoons in the elastic layer of the press roller of the present Example were heat-resistant to a temperature of about 250° C. and in order to keep the temperature at 220° C., the throughput was lowered to ⅔ after 51th sheet feeding by making paper feed intervals longer.

Example 3

Elastic layers **24*b*** were formed in which expanded resin microballoons (trade name: F80-ZD; available from Matsumoto Yushi-Seiyaku Co., Ltd.) whose shells were formed of acrylonitrile resin and expanded resin microballoons (trade name: BJO-0930; available from Asia Pacific Microsphere Co., Ltd.) whose shells were formed of phenolic resin were respectively mixed in a silicone rubber (trade name: DY35-561A/B) having a hardness of 5° when its test piece of 12 mm thick was measured with a JIS-A hardness meter (load: 1 kg). The content of the resin microballoons in each elastic layer was changed as shown in Table 2. These elastic layers were each applied in the heating assembly of Example 1, and the hardness of each elastic layer and the heat-resistance temperature at which the roller hardness was maintainable were measured. The results of measurement are shown in Table 2.

TABLE 2

| | | | | | |
|---|---|---|---|---|---|
| Amount of phenol balloons: | 20 wt. % | 18 wt. % | 16 wt. % | 14 wt. % | 12 wt. % |
| Amount of acrylonitrile balloons: | 0 wt. % | 0.3 wt. % | 0.5 wt. % | 0.7 wt. % | 1 wt. % |
| Roller hardness: | 55° | 50° | 45° | 40° | 38° |
| Roller hardness down heat-resistance: | 240° C. | 240° C. | 240° C. | 240° C. | 200° C. |

As can be seen from the above results, when the resin microballoons whose shells are formed of acrylonitrile resin are incorporated in an amount of 1% by weight or more, the temperature at which the roller hardness lowers comes to be 200° C. However, there is no change when incorporated in an amount smaller than that. Hence, taking account of the temperature rise of the non-paper-feed region at the time of continuous feed of small-sized paper, it is desirable to be in an amount smaller than 1% by weight for the resin microballoons whose shells are formed of acrylonitrile resin. Also, as for the amount of the resin microballoons whose shells are formed of phenol resin, it is desirable for them to be incorporated in an amount not more than 20% by weight as also stated previously, because the roller hardness is desired to be set at 55° or lower (measured with Asker-C Hardness Meter under a load of 600 g), and if possible 50° or lower.

In addition, as to the roller hardness, in order to attain the desired hardness, it may be finely adjusted by controlling the hardness of the base rubber or the thickness of the elastic layer after the thermal conductivity has been adjusted by controlling the mixing ratio.

Thus, dispersing such two types of resin microballoons provides an elastic layer having superior heat-resistant properties, and also having a low thermal conductivity and enabling roller hardness to be adjusted.

Example 4

To 100 parts by weight of unexpanded resin microballoons (trade name: Matsumoto Microspheres F85; particle diameter: 20 to 30 μm; true specific gravity: 1.04; wall-providing softening point: 150 to 155° C.; available from Matsumoto Yushi-Seiyaku Co., Ltd.), 100 parts by weight of dimethylsilicone oil (trade name: Dimethylpolysiloxane KF96 100CS; available from Shin-Etsu Chemical Co., Ltd.) was added, and the mixture obtained was stirred and then left for 10 hours to obtain a pasty mixture wetted with silicone oil. This pasty mixture was left in a 90° C. oven for 1 hour to dryness. After cooling, the dried product was left for 30 minutes in an oven set at a heat expansion temperature, 150° C., to form expanded resin microballoons with an average particle diameter of 108 μm. In 100 parts by weight of an addition type liquid silicone rubber material (viscosity: 130 Pa·s; specific gravity: 1.17; trade name: DY35-561A/B; available from Dow Corning Toray Silicone Co., Ltd.), 8 parts by weight of the expanded resin microballoons were mixed, followed by blending and stirring for 10 minutes at room temperature by means of an all-purpose mixing stirrer (trade name DULTON; manufactured by K.K. San-ei Seisakusho) to make up a liquid silicone rubber material mixture. The resin microballoons had increased in bulk volume by about 60 times, but there was no trouble due to their scattering (no scattering occurred), in the next steps of weight measurement and mixing. This was attributable to the adhesion of dimethylsilicone oil to the surfaces of the expanded resin microballoons.

Next, the liquid silicone rubber material mixture was injected into a pipe-like mold provided at its center with an aluminum mandrel **24*a* having been subjected to primer treatment, followed by heat-curing by means of a hot platen set at 130° C., and after demolding, further followed by heating for 2 hours in an oven set at 230° C. to break the microballoon shape of the shell resin of the resin microballoons, thus a roller having a silicone rubber elastic layer 24*b* was formed. This elastic layer 24*b*** had a thermal conductivity of 0.085 W/m·K.

The surface of such a silicone rubber elastic roller was subjected to stated primer treatment (primer's trade name: GLP103SR, available from Daikin Industries, Ltd.). Thereafter, to form the release layer **24*d*** thereon, a fluorine rubber latex (trade name: GLS213, available from Daikin Industries, Ltd.) was spray-applied in a thickness of about 30 μm, followed by drying at 70° C., and thereafter baking for 30 minutes in an oven set at a temperature of 310° C., thus a press roller having a rubber length of 225 mm, a rubber thickness of 2.5 mm and an outer diameter of 20 mm was obtained.

Example 5

The unexpanded resin microballoons (trade name: Matsumoto Microspheres F85; particle diameter: 20 to 30 μm; true specific gravity: 1.04; wall-providing softening point: 150 to 155° C.; available from Matsumoto Yushi-Seiyaku Co., Ltd.) used in Example 4 were not wetted with silicone oil and were directly left in a 90° C. oven for 1 hour to dryness. After cooling, the dried product was left for 30 minutes in an oven set at a heat expansion temperature, 150° C., to form expanded resin microballoons with an average particle diameter of 110 μm. In 100 parts by weight of an addition type liquid silicone rubber material (viscosity: 130 Pa·s; specific gravity: 1.17; trade name: DY35-561A/B; available from Dow Corning Toray Silicone Co., Ltd.), 4 parts by weight of the expanded resin microballoons were mixed, followed by blending and stirring for 10 minutes at room temperature by means of an all-purpose mixing stirrer (trade name DULTON; manufactured by K.K. San-ei Seisakusho) to make up a liquid silicone rubber material mixture. The resin microballoons had increased in bulk volume by about 60 times, and, in the next steps of weight measurement and mixing, caused a very poor operability due to their scattering.

Next, to the inside of a pipe-like mold, a PFA tube of 30 μm thick having been subjected to primer treatment was inserted, and an aluminum mandrel 24*a* having been subjected to primer treatment was disposed at the center of the pipe-like mold. The above liquid silicone rubber material mixture was injected into the space between the PFA tube and the aluminum mandrel, followed by heat-curing by means of a hot platen set at 130° C., thus a silicone rubber press roller having a rubber length of 225 mm, a rubber thickness of 2.5 mm and an outer diameter of 20 mm was obtained. The silicone rubber elastic layer had a thermal conductivity of 0.085 W/m·K.

Example 6

To 100 parts by weight of unexpanded resin microballoons (trade name: Matsumoto Microspheres F85; particle diameter: 20 to 30 μm; true specific gravity: 1.04; wall-providing softening point: 150 to 155° C.; available from Matsumoto Yushi-Seiyaku Co., Ltd.), 100 parts by weight of a 50% solution of a silicone oil (methylhyrogenpolysiloxane; trade name: KF99; available from Shin-Etsu Chemical Co., Ltd.) in toluene was added, and the mixture obtained was stirred and then left for 10 hours to obtain a pasty mixture wetted with silicone oil. This pasty mixture was left in a 90° C. oven for 1 hour to dryness. After cooling, the dried product was left for 30 minutes in an oven set at a heat expansion temperature, 150° C., to form expanded resin microballoons with an average particle diameter of 108 μm. In 100 parts by weight of an addition type liquid silicone rubber material (viscosity: 40 Pa·s; specific gravity: 1.02; trade name: DY35-446A/B; available from Dow Corning Toray Silicone Co., Ltd.), 3 parts by weight of the expanded resin microballoons (corresponding to 2 parts of microballoons themselves) were mixed, followed by blending and stirring for 10 minutes at room temperature by means of an all-purpose mixing stirrer (trade name DULTON; manufactured by K.K. San-ei Seisakusho) to make up a liquid silicone rubber material mixture. Subsequently, the same procedure as in Example 4 was repeated to obtain a silicone rubber press roller having a rubber length of 225 mm, a rubber thickness of 2.5 mm and an outer diameter of 20 mm. The silicone rubber elastic layer had a thermal conductivity of 0.094 W/m·K.

Example 7

To 100 parts by weight of unexpanded resin microballoons (trade name: Matsumoto Microspheres F85; particle diameter: 20 to 30 μm; true specific gravity: 1.04; wall-providing softening point: 150 to 155° C.; available from Matsumoto Yushi-Seiyaku Co., Ltd.), 100 parts by weight of a silicone oil (amino-modified silicone; trade name: SF8417; available from Dow Corning Toray Silicone Co., Ltd.) was added, and the mixture obtained was stirred and then left for 10 hours to obtain a pasty mixture wetted with silicone oil. This pasty mixture was left in a 90° C. oven for 1 hour to dryness. After cooling, the dried product was left for 30 minutes in an oven set at a heat expansion temperature, 150° C., to form expanded resin microballoons with an average particle diameter of 102 μm. In 100 parts by weight of an addition type liquid silicone rubber material (viscosity: 40 Pa·ss; specific gravity: 1.02; trade name: DY35-446A/B; available from Dow Corning Toray Silicone Co., Ltd.), 4 parts by weight of the expanded resin microballoons (corresponding to 2 parts of microballoons themselves) and 1 part by weight of a peroxide type vulcanizing agent (2,4-dichlorobenzoyl peroxide; trade name: RC-2; available from Dow Corning Toray Silicone Co., Ltd.) were mixed, followed by blending and stirring for 10 minutes at room temperature by means of an all-purpose mixing stirrer (trade name DULTON; manufactured by K.K. San-ei Seisakusho) to make up a liquid silicone rubber material mixture. Subsequently, the same procedure as in Example 4 was repeated to obtain a silicone rubber heat-insulating press roller having a rubber length of 225 mm, a rubber thickness of 2.5 mm and an outer diameter of 20 mm. The silicone rubber elastic layer had a thermal conductivity of 0.105 W/m·K.

Test Example

The press rollers of Examples 4 to 7 were tested as reported below, in order to ascertain their performance.

FIG. 2 schematically cross-sectionally illustrates a film-heating type fixing assembly used in this test example.

As a heat-resistant film 23, used was a seamless polyimide film 40 μm in thickness and 25 mm in outer diameter which was coated, via a fluorine type primer 5 μm in thickness, with a fluorine resin dispersion (a 50/50 blend of PTFE and PFA), followed by baking to form a release layer, and then was cut in a length of 230 mm.

Reference numeral 24 denotes the press roller, and those obtained in Examples 4 to 7 were tested in order.

Using the above film-heating type fixing assembly, a paper feed test was made under conditions shown below. First, 1,000 sheets of A5-sized paper on which unfixed images were formed using a laser beam printer (trade name: LASER SHOT LBP350; manufactured by CANON INC.) were lengthwise fed at intervals of 8 sheets/minute on the basis of the middle of the fixing assembly. Immediately thereafter, 5 sheets of A4-sized paper were lengthwise fed, and transport performance at that time was evaluated. The results are shown in Table 3.

Test Conditions

Press roller peripheral speed: 50 mm/sec
Nip pressure: 9 kgf
Maximum feed power: 500 W
Fixing set temperature: 190° C.

In the case of the press roller of Example 4, its hardness (Asker-C) lowered at both the middle area and the end areas (A5 paper non-feed region) of the roller, but the difference was so small that there was no problem on transport performance, such as paper wrinkling, even when A4-sized paper was passed.

On the other hand, in the case of the press roller of Example 5, its hardness (Asker-C) lowered greatly at the end areas (A5 paper non-feed region) of the roller, and the difference in hardness at boundaries between the middle area and the end areas was so large as to cause paper wrinkling when A4-sized paper was passed, bringing about a problem on transport performance.

In the case of the press rollers of Examples 6 and 7, their hardness (Asker-C) lowered only a little at both the middle area and the end areas (A5 paper non-feed region) of the roller, and there was no problem on transport performance, such as paper wrinkling, even when A4-sized paper was passed.

TABLE 3

| | Example 4 | Example 5 | Example 6 | Example 7 |
|---|---|---|---|---|
| Transport performance: | A | C Paper wrinkled by three sheets in five sheets | A | A |
| Change in hardness | | | | |
| at the middle area: | −2° | −2° | −1° | −1° |
| at end areas: | −4° | −10° | −1° | −1° |

What is claimed is:

1. A heating assembly comprising a heating means for heating a sheetlike heating target material and a press roller disposed face to face with the heating means; the heating target material being guided to a pressure contact nip formed between the heating means and the press roller so as to be held and transported between them to heat the heating target material; wherein said press roller has an elastic layer incorporated dispersedly with resin microballoons;

wherein said elastic layer is a rubber layer incorporated dispersedly with the voids, and wherein the resin microballoons are broken by heating after the rubber layer is cured and resin shells of the resin microballoons are present between the rubber and the voids in the state they have been broken.

2. The heating assembly according to claim 1, wherein said elastic layer has a thermal conductivity of 0.146 W/m·K or lower.

3. The heating assembly according to claim 1, wherein the resin that forms said shells of the resin microballoons is thermoplastic resin.

4. The heating assembly according to claim 3, wherein said thermoplastic resin is a thermoplastic resin selected from an acrylonitrile resin and a vinylidene chloride resin.

5. The heating assembly according to claim 1, wherein the resin that forms said shells of the resin microballoons is thermosetting resin.

6. The heating assembly according to claim 5, wherein said thermosetting resin is a phenolic resin.

7. The heating assembly according to claim 1, wherein said resin microballoons comprise a mixture of resin microballoons whose shells are formed of a thermoplastic resin and resin microballoons whose shells are formed of a thermosetting resin.

8. The heating assembly according to claim 1, wherein said resin microballoons have an average particle diameter of from 80 μm to 200 μm.

9. The heating assembly according to claim 1, wherein said press roller has a release layer as the outermost layer.

10. The heating assembly according to claim 9, wherein said release layer is formed of a material selected from the group consisting of a fluorine resin and a fluorine rubber.

11. The heating assembly according to claim 1, wherein said press roller has a surface roughness Ra of 3 μm or less.

12. The heating assembly according to claim 1, wherein said press roller has a surface roughness of 55° or less as Asker-C hardness.

13. The heating assembly according to claim 1, wherein said press roller has a foamed elastic layer as an inner layer of the elastic layer.

14. The heating assembly according to claim 1, wherein said heating target material is a recording medium holding thereon an unfixed image, and the unfixed image is heated and fixed at the pressure contact nip formed between the heating means and the press roller.

15. An image-forming apparatus comprising an image-forming means for forming an unfixed image on a recording medium so as to be held thereon and a heat-fixing assembly for heat-fixing the unfixed image to the recording medium, wherein;

said heat-fixing assembly is the heating assembly according to any one of claims 1, 2 and 7 to 13.

16. A process for producing a silicone rubber sponge, comprising the steps of;

heat-expanding unexpanded resin microballoons wet-treated with a silicone oil;

mixing the heat-expanded resin microballoons in a liquid silicone rubber material;

heat-curing the liquid silicone rubber; and heating the resin microballoons at a temperature not lower than the expansion start temperature of the resin microballoons to break the microballoon shape of the shell resin of the resin microballoons.

17. The silicone rubber sponge production process according to claim 16, wherein the resin microballoons having been heat-expanded have an average particle diameter of from 80 μm to 200 μm.

18. The silicone rubber sponge production process according to claim 16, wherein said silicone oil is methyl hydrogen polysiloxane.

19. The silicone rubber sponge production process according to claim 16, wherein said silicone oil is an amino-modified silicone oil.

20. A roller comprising a mandrel and provided thereon the silicone rubber sponge produced by the production process according to any one of claims 16 to 19.

21. A process for producing a roller, comprising the steps of;

heat-expanding unexpanded resin microballoons;

mixing the heat-expanded resin microballoons in a liquid silicone rubber material;

heating the mixture on a mandrel to cure the liquid silicone rubber, and after heat-curing the liquid silicone rubber material, heating the resin microballoons at a temperature not lower than the expansion start temperature of the resin microballoons to break the microballoon shape of the shell resin of the resin microballoons.

22. The roller production process according to claim 21, which further comprises, after breaking the microballoon shape of the shell resin, the step of forming a release layer on the roller surface.

23. The roller production process according to claim 21, wherein said liquid silicone rubber is heat-cured at a temperature not higher than the expansion start temperature of the resin microballoons.

24. A press roller produced by the roller production process according to any one of claims 21 to 23.

25. A heat-fixing assembly comprising;

a heating means for heating a recording medium holding thereon an unfixed image to fix the unfixed image, and a press roller disposed face to face with the heating means and brought into pressure contact with the heating means to form a pressure contact nip, wherein;

said press roller is a roller produced by the roller production process according to any one of claims 21 to 23.

* * * * *

UNITED STATES PATENT AND TRADEMARK OFFICE

CERTIFICATE OF CORRECTION

PATENT NO. : 6,459,878 B1 
DATED : October 1, 2002
INVENTOR(S) : Yoji Tomoyuki et al.

It is certified that error appears in the above-identified patent and that said Letters Patent is hereby corrected as shown below:

Title page,
Item [56], References Cited, FOREIGN PATENT DOCUMENTS,
"JP 10-060151 3/1998" should be deleted.

Column 5,
Lines 23 and 24, "forms" should read -- form --.

Column 9,
Line 8, "sate" should read -- state --.
Line 53, "the heat" should be deleted.
Line 61, "case" should read -- cause --.

Column 18,
Line 11, "timer" should read -- time --.

Column 21,
Line 34, "(methylhyrogenpolysilonane;" should read
-- (methylhydrogenpolysilonane --.

Signed and Sealed this

Eighteenth Day of March, 2003

JAMES E. ROGAN
*Director of the United States Patent and Trademark Office*